United States Patent
Mehrvar et al.

(10) Patent No.: US 11,038,615 B2
(45) Date of Patent: Jun. 15, 2021

(54) FAST CONNECTION TURN-UP WITH PATH-BASED DUMMY LIGHTS

(71) Applicants: Hamid Mehrvar, Ottawa (CA); Christopher Janz, Dunrobin (CA)

(72) Inventors: Hamid Mehrvar, Ottawa (CA); Christopher Janz, Dunrobin (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/383,310

(22) Filed: Apr. 12, 2019

(65) Prior Publication Data

US 2019/0319735 A1 Oct. 17, 2019

Related U.S. Application Data

(60) Provisional application No. 62/658,369, filed on Apr. 16, 2018.

(51) Int. Cl.
*H04J 14/02* (2006.01)
*H04Q 11/00* (2006.01)

(52) U.S. Cl.
CPC ...... *H04J 14/0212* (2013.01); *H04J 14/0278* (2013.01); *H04J 14/0294* (2013.01); *H04Q 11/0005* (2013.01)

(58) Field of Classification Search
CPC .......................... H04J 14/0271; H04J 14/0212
See application file for complete search history.

(56) References Cited

U.S. PATENT DOCUMENTS 6,522,803 B1 * 2/2003 Nakajima .......... H04Q 11/0005
385/24
7,177,540 B2 2/2007 Inoue et al.
(Continued)

FOREIGN PATENT DOCUMENTS

CN 101909008 A 12/2010
EP 3439200 A1 2/2019
(Continued)

OTHER PUBLICATIONS

Y. Huang et al., "Dynamic mitigation of EDFA power excursions with machine learning", vol. 25, No. 3 | Feb. 6, 2017 | Optics Express 2245.
(Continued)

*Primary Examiner* — David C Payne
*Assistant Examiner* — Pranesh K Barua

(57) ABSTRACT

A method of managing an optical communications network comprising a plurality of nodes interconnected by optical sections. The method comprises: identifying one or more pairs of adjacent DL-equipped nodes at which dummy light (DL) hardware is deployed, respective dummy light (DL) hardware being deployed at fewer than the plurality of the nodes of the optical communications network, the respective DL hardware deployed at a particular node configured to supply dummy light to each optical section extending from the particular node, and defining a respective single-section DL path between each identified pair of adjacent DL-equipped nodes; identifying one or more pairs of non-adjacent DL-equipped nodes at which DL hardware is deployed, and defining a respective multi-section DL path between each identified pair of non-adjacent DL-equipped nodes; and causing the deployed DL hardware to supply DL light to each of the single- and the multi-section DL paths.

14 Claims, 11 Drawing Sheets

(56) References Cited

U.S. PATENT DOCUMENTS

| | | | | |
|---|---|---|---|---|
| 2006/0023996 | A1* | 2/2006 | Nakagawa | H04J 14/0206 |
| | | | | 385/24 |
| 2008/0310858 | A1* | 12/2008 | Lu | H04B 10/296 |
| | | | | 398/158 |
| 2009/0238574 | A1* | 9/2009 | Sone | H04Q 11/0005 |
| | | | | 398/139 |
| 2011/0311216 | A1 | 12/2011 | Inoue | |
| 2014/0328587 | A1* | 11/2014 | Magri | H04L 45/62 |
| | | | | 398/26 |
| 2014/0363152 | A1* | 12/2014 | Hironaka | H04Q 11/0005 |
| | | | | 398/5 |
| 2018/0123724 | A1* | 5/2018 | Zhang | H04J 14/0212 |
| 2018/0262292 | A1* | 9/2018 | Dangui | H04J 14/0205 |

FOREIGN PATENT DOCUMENTS

| | | | | |
|---|---|---|---|---|
| WO | WO-2013170909 | A1 * | 11/2013 | H04J 14/0284 |
| WO | 2017168994 | A1 | 10/2017 | |

OTHER PUBLICATIONS

T. Inoue et al., "In-service Upgrade Method for DWDM Submarine Cable System Using ASE Dummy Lights", OFC 2004.

\* cited by examiner

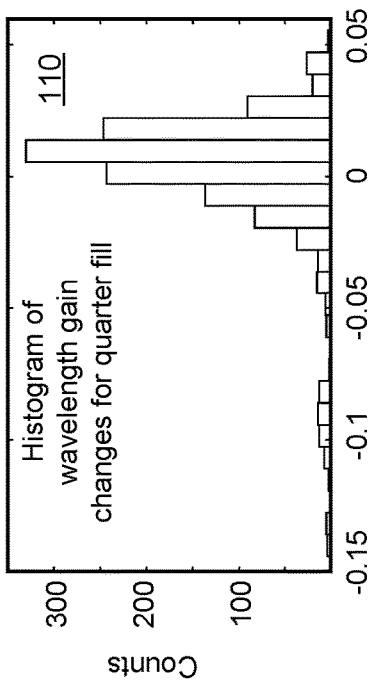
FIG. 1A
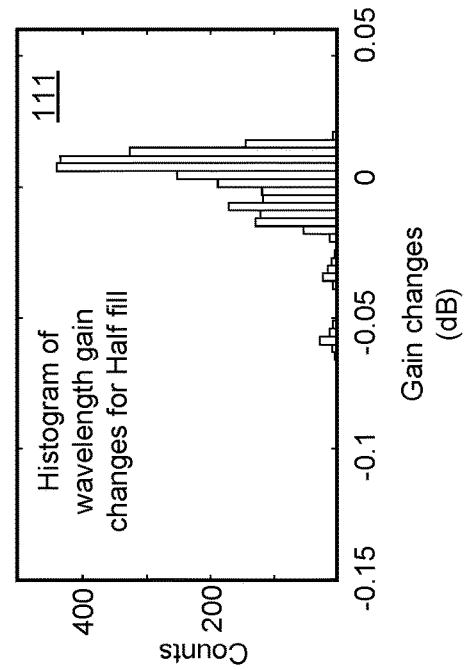
FIG. 1C
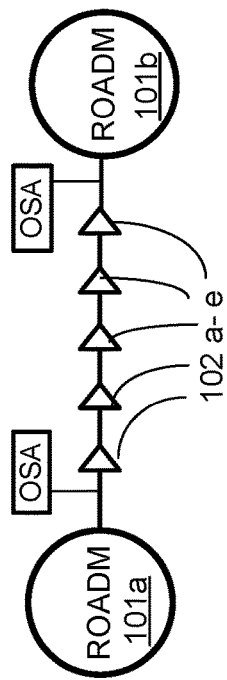
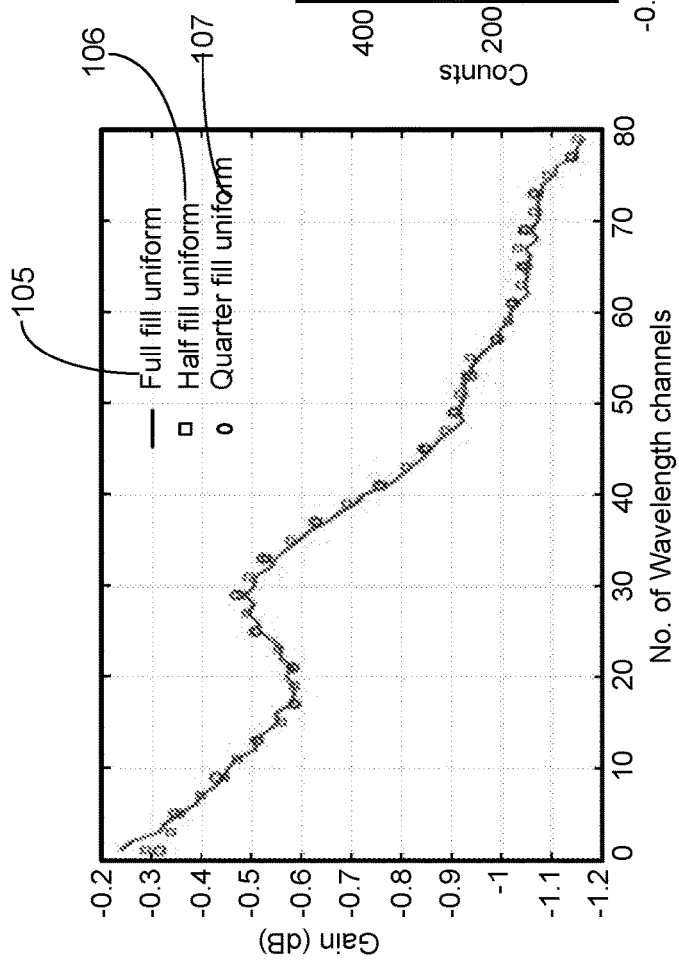
FIG. 1B
FIG. 1D

600

| Identifying pairs of adjacent DL-equipped nodes at which dummy light hardware is deployed at fewer than the plurality of the nodes of an optical communications network, the DL hardware deployed at a particular node configured to supply dummy light to each optical section extending from the particular node and defining a respective single-section DL path between each identified pair of adjacent DL-equipped nodes |
|---|

610

| Identifying pairs of non-adjacent DL-equipped nodes at which DL hardware is deployed, and defining a respective multi-section DL path between each identified pair of non-adjacent DL-equipped nodes |
|---|

620

| Causing the deployed DL hardware to supply DL light to each of the single-section and the multi-section DL paths |
|---|

Allocating dummy light (DL) hardware to a subset of a plurality of nodes of an optical network, the subset comprising less than the plurality of nodes

710

---

For each pair of non-adjacent nodes to which DL hardware is allocated, identifying candidate multi-section DL paths between the pair of non-adjacent nodes and analyzing each candidate multi-section DL path to identify a best candidate multi-section DL path that satisfies a condition of half-fill or more on each section of the path

720

---

Implementing the identified best candidate multi-section DL path by controlling each one of the pair of non-adjacent nodes to transmit or terminate dummy light through the identified best one of the candidate multi-section DL paths, and controlling intermediate nodes traversed by the identified best one of the candidate multi-section DL paths to pass through dummy light associated with the identified best one of the candidate multi-section DL paths

FAST CONNECTION TURN-UP WITH PATH-BASED DUMMY LIGHTS

CROSS-REFERENCE TO RELATED APPLICATIONS

This application claims the benefit of priority to U.S. Provisional Application Ser. No. 62/658,369 filed Apr. 16, 2018, the contents of which are hereby incorporated by reference.

FIELD OF THE INVENTION

The present invention pertains to the field of optical communication systems, and in particular to systems and methods for configuring optical communication systems.

BACKGROUND

Next generation optical networks require rapid reconfiguration of optical networks in response to growing dynamic demands from cloud computing and the vast amount of video traffic streaming. Today, optical networks are operationally quasi-static as optical layer re-configuration is impeded by wavelength-dependent power excursions in gain-controlled erbium doped fibre amplifiers (EDFA). This is mostly due to the amplifier-based physical effects, e.g., spectral hole burning, as the channel configuration changes rapidly. As a result, the optical layer cannot be freely and rapidly re-configured under software control, in response to demand. This reduces the relative functional utility of the optical layer in a dynamic service environment and, hence, largely keeps the optical layer network outside the span of the operational "all-cloud" paradigm. As a result, the main challenge to achieve fast optical re-configuration is to address the wavelength-dependent power excursions of EDFAs during rapidly changing channel configurations.

Power changes in gain controlled EDFAs are two types: transient and steady-state. The transient time is related to EDFA gain control loops and it is on the time scale of 10 s of micro-seconds as the input power changes. These loops maintain the average gain across the spectrum, however, the steady-state wavelength dependent power excursions can impact quality of service for the existing connections.

Several hardware- and software-based solutions attempted to tackle this issue. For instance, a software and machine learning (ML) engine has been used to accurately predict the power excursions as a channel is provisioned in a WDM network with multiple cascaded EDFAs. The hardware-based methods for fast optical re-configuration avoid amplifier dynamic effects by using dummy lights to fill the unused spectrum, and hence, stabilize the amplifier behaviour. These solutions are section based, in that each reconfigurable optical add-drop multiplexer (ROADM) node is equipped with dummy light sources, typically either continuous wave (CW) lasers or amplified spontaneous emission (ASE) and the dummy light propagates through a single optical section to the next ROADM. The Wavelength Selective Switch (WSS) filtering on each direction ensures a full-fill implementation of gain profile and enables high-speed path switchover without producing steady-state optical surges or decreasing transmission quality. The advantage of this solution is that it provides a fast and reliable optical re-configuration on the time scales of WSS switch over time that swaps a dummy light channel with a signal channel (and vice-versa). However, to deploy such a solution, network operators need to install dummy light hardware at all of the nodes of the network to equip them with dummy light sources on each direction. In existing networks, some nodes may not have available shelf slot(s) to accept the dummy light hardware.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide techniques that overcome at least some of the foregoing limitations of the prior art.

Accordingly, an aspect of the present invention provides a method of managing an optical communications network comprising a plurality of nodes interconnected by optical sections. The method comprises: deploying respective dummy light (DL) hardware at fewer than all of the nodes of the optical communications network, the respective DL hardware deployed at a particular node being configured to supply dummy light to each optical section extending from that node; identifying one or more pairs of adjacent DL-equipped nodes at which DL hardware is deployed, and defining a respective single-section DL path between each identified pair of adjacent DL-equipped nodes; identifying one or more pairs of non-adjacent DL-equipped nodes at which DL hardware is deployed, and defining a respective multi-section DL path between each identified pair of non-adjacent DL-equipped nodes; and causing the deployed DL hardware to supply DL light to each DL path.

In one aspect, the method further comprises controlling a non-DL equipped node to pass dummy light from one optical section associated with the non-DL equipped node to at least one other optical section associated with the non-DL equipped node.

In one embodiment, defining a respective single-section DL path between each identified pair of adjacent DL-equipped nodes comprises, for each pair of non-adjacent nodes to which DL hardware is allocated: identifying candidate multi-section DL paths between the pair of non-adjacent nodes; and
analyzing each candidate multi-section DL path to identify a best candidate multi-section DL path that satisfies a condition of half-fill or more on each section of the path.

In alternate embodiments, other threshold fill conditions other than a half-fill condition may be applied to each section of the path. For example, in some embodiments, threshold fill conditions of 30% to 45% may be applied, though it is contemplated that other threshold fill conditions may be used.

In one variation, two or more candidate multi-section DL paths satisfy the condition of half-fill or more on each section of the path, and analyzing each candidate multi-section DL path to identify a best candidate multi-section DL path comprises, for each candidate multi-section DL paths that satisfies the condition of half-fill or more on each section of the path:
analyzing an optical signal loading of each section of the candidate multi-section DL path; and
identifying the best candidate multi-section DL path that satisfies a condition of a lowest optical signal loading in a first section of the candidate multi-section DL path and a highest optical signal loading in a last section of the candidate multi-section DL path.

In another aspect, the method further comprises:
detecting a failure of DL hardware at a DL-equipped node, the failed DL hardware previously supplying dummy light to an outbound DL path;
responsive to detecting the DL hardware failure:
identifying an inbound DL path having an end-point at the DL-equipped node; and
controlling the DL-equipped node to pass through dummy light from the identified inbound DL path to the at least one outbound DL path.

In one variation, the outbound DL path is either a single-section DL path or a multi-section DL path.

In another variation, the inbound DL path is either a single-section DL path or a multi-section DL path.

In another broad aspect, also provided is a method of managing an optical communications network comprising a plurality of nodes interconnected by optical sections, the method comprising:
allocating dummy light (DL) hardware to a subset of the plurality of nodes, the subset comprising less than all of the plurality of nodes; and
for each pair of non-adjacent nodes to which DL hardware is allocated:
identifying candidate multi-section DL paths between the pair of non-adjacent nodes;
analyzing each candidate multi-section DL path to identify a best candidate multi-section DL path that satisfies a condition of half-fill or more on each section of the path; and
implementing the identified best candidate multi-section DL path by:
controlling each one of the pair of non-adjacent nodes to transmit or terminate dummy light through the identified best one of the candidate multi-section DL paths; and
controlling intermediate nodes traversed by the identified best one of the candidate multi-section DL paths to pass through dummy light associated with the identified best one of the candidate multi-section DL paths.
In another aspect the method further comprises, wherein two or more candidate multi-section DL paths satisfy the condition of half-fill or more on each section of the path, and wherein the analyzing each candidate multi-section DL path to identify a best candidate multi-section DL path comprises, for each candidate multi-section DL paths that satisfies the condition of half-fill or more on each section of the patanalyzing an optical signal loading of each section of the candidate multi-section DL path; and
identifying one of an optimal and a sub-optimal candidate multi-section DL path that satisfies a condition of a relatively low utilization optical signal loading in a first section of the candidate multi-section DL path and a relatively high utilization optical signal loading in a last section of the candidate multi-section DL path.

In one broad aspect of the invention, provided is a method of managing an optical communications network comprising a plurality of nodes interconnected by optical sections. The method comprises: identifying one or more pairs of adjacent DL-equipped nodes at which dummy light (DL) hardware is deployed, respective dummy light (DL) hardware being deployed at fewer than the plurality of the nodes of the optical communications network, the respective DL hardware deployed at a particular node configured to supply dummy light to each optical section extending from the particular node, and defining a respective single-section DL path between each identified pair of adjacent DL-equipped nodes; identifying one or more pairs of non-adjacent DL-equipped nodes at which DL hardware is deployed, and defining a respective multi-section DL path between each identified pair of non-adjacent DL-equipped nodes; and causing the deployed DL hardware to supply DL light to each of the single- and the multi-section DL paths.

In another aspect, the method further comprises controlling a non-DL equipped node to pass dummy light from one optical section associated with the non-DL equipped node to at least one other optical section associated with the non-DL equipped node.

In yet another aspect, defining a respective single-section DL path between each identified pair of adjacent DL-equipped nodes comprises, for each pair of non-adjacent nodes to which DL hardware is allocated: identifying candidate multi-section DL paths between the pair of non-adjacent nodes; and analyzing each candidate multi-section DL path to identify at least one of an optimal and a sub-optimal candidate multi-section DL path that satisfies a threshold fill condition on each section of the path. In alternate embodiments, threshold fill conditions other than a half-fill condition may be applied to each section of the path. For example, in some embodiments, threshold fill conditions of 30% to 45% may be applied, though it is contemplated that other threshold fill conditions may be used.

In another embodiment of the method, wherein two or more candidate multi-section DL paths satisfy the threshold fill condition on each section of the path, analyzing each candidate multi-section DL path to identify an optimal candidate multi-section DL path comprises, for each candidate multi-section DL paths that satisfies the threshold fill condition on each section of the path: analyzing an optical signal loading of each section of the candidate multi-section DL path; and identifying the multi-section DL path that satisfies a condition of a relatively lower optical signal loading in a first section of the candidate multi-section DL path and a relatively higher optical signal loading in a last section of the candidate multi-section DL path. In some embodiments, the relatively lower and higher utilization optical signal loading may be derived based on a utilization chart of a routing scheme that is utilized by the network.

In another variation, the method further comprises detecting a failure of DL hardware at a DL-equipped node, the failed DL hardware previously supplying dummy light to an outbound DL path; responsive to detecting the DL hardware failure: identifying an inbound DL path having an end-point at the DL-equipped node; and controlling the DL-equipped node to pass through dummy light from the identified inbound DL path to the at least one outbound DL path.

In one aspect, the outbound DL path is one of a single-section DL path and a multi-section DL path.

In another aspect, the inbound DL path is one of a single-section DL path and a multi-section DL path.

In yet another aspect, the dummy light hardware comprises one of a continuous wave (CW) laser source and an amplified spontaneous emission (ASE) source.

In one variation, the DL path is one of pre-determined and dynamically changed within the optical communications network.

Also provided, in another broad aspect, is a method of managing an optical communications network comprising a plurality of nodes interconnected by optical sections. The method comprises allocating dummy light (DL) hardware to a subset of the plurality of nodes, the subset comprising less than all of the plurality of nodes; and for each pair of non-adjacent nodes to which DL hardware is allocated: identifying candidate multi-section DL paths between the pair of non-adjacent nodes; analyzing each candidate multi-section DL path to identify at least one of an optimal and a sub-optimal candidate multi-section DL path that satisfies a threshold fill condition on each section of the path; and implementing the identified one of the optimal and the sub-optimal candidate multi-section DL path by: controlling each one of the pair of non-adjacent nodes to transmit or terminate dummy light through the identified candidate multi-section DL paths; and controlling intermediate nodes traversed by the identified candidate multi-section DL paths to pass through dummy light associated with the identified candidate multi-section DL paths.

In one aspect, wherein two or more candidate multi-section DL paths satisfy the threshold fill condition on each section of the path, the analyzing each candidate multi-section DL path to identify an optimal candidate multi-section DL path comprises, for each candidate multi-section DL paths that satisfies the threshold fill condition on each section of the path: analyzing an optical signal loading of each section of the candidate multi-section DL path; and identifying the optimal candidate multi-section DL path that satisfies a condition of a relatively lower optical signal loading in a first section of the candidate multi-section DL path and a relatively higher optical signal loading in a last section of the candidate multi-section DL path.

In yet another aspect, the method further comprises detecting a failure of DL hardware at a DL-equipped node, the failed DL hardware previously supplying dummy light to an outbound DL path; responsive to detecting the DL hardware failure: identifying an inbound DL path having an end-point at the DL-equipped node; and controlling the DL-equipped node to pass through dummy light from the identified inbound DL path to the at least one outbound DL path.

In one aspect, the outbound DL path is one of a single-section DL path and a multi-section DL path.

In another aspect, the inbound DL path is one of a single-section DL path and a multi-section DL path.

In some embodiments, the dummy light hardware comprises a single source that includes one of a continuous wave (CW) laser source and an amplified spontaneous emission (ASE) source.

In some variations, the single source is split and propagated to a set of links in all directions of a ROADM node in conjunction with filtering for each inbound or out-bound links of the ROADM node.

Further provided, in another broad aspect, is an optical network comprising a plurality of nodes interconnected by optical sections; and a controller. the controller comprises a processor; and a non-transient memory storing instructions executable in the processor to: allocate dummy light (DL) hardware to a subset of the plurality of nodes, the subset comprising less than all of the plurality of nodes; and for each pair of non-adjacent nodes to which DL hardware is allocated: identify candidate multi-section DL paths between the pair of non-adjacent nodes; analyze each candidate multi-section DL path to identify an optimal candidate multi-section DL path that satisfies a threshold fill condition on each section of the path; and implement the identified optimal candidate multi-section DL path by: controlling each one of the pair of non-adjacent nodes to transmit or terminate dummy light through the identified best one of the candidate multi-section DL paths; and controlling intermediate nodes traversed by the identified best one of the candidate multi-section DL paths to pass through dummy light associated with the identified best one of the candidate multi-section DL paths.

In some embodiments, wherein two or more candidate multi-section DL paths satisfy the threshold fill condition on each section of the path, and the memory further comprises instructions executable to analyze each candidate multi-section DL path to identify an optimal candidate multi-section DL path, for each candidate multi-section DL paths that satisfies the threshold fill condition on each section of the path, by: analyzing an optical signal loading of each section of the candidate multi-section DL path; and identifying the optimal candidate multi-section DL path that satisfies a condition of a relatively lower optical signal loading in a first section of the candidate multi-section DL path and a relatively higher optical signal loading in a last section of the candidate multi-section DL path.

In some embodiments, the memory further comprises instructions executable in the processor to: detect a failure of DL hardware at a DL-equipped node, the failed DL hardware previously supplying dummy light to an outbound DL path; responsive to detecting the DL hardware failure: identify an inbound DL path having an end-point at the DL-equipped node; and control the DL-equipped node to pass through dummy light from the identified inbound DL path to the at least one outbound DL path.

In other embodiments, the outbound DL path is one of a single-section DL path and a multi-section DL path.

In another variation, the inbound DL path is one of a single-section DL path and a multi-section DL path.

In other aspects, the dummy light hardware comprises a single source that includes one of a continuous wave (CW) laser source and an amplified spontaneous emission (ASE) source.

In some embodiments, the single source is split and propagated to a set of links in all directions of a ROADM node in conjunction with filtering for each inbound or out-bound links of the ROADM node.

BRIEF DESCRIPTION OF THE FIGURES

Further features and advantages of the present invention will become apparent from the following detailed description, taken in combination with the appended drawings, in which:

FIG. 1A is a block diagram illustrating a representative section in an optical network;

FIG. 1B is a chart illustrating representative gain changes in the optical network section of FIG. 1A;

FIGS. 1C and 1D are histograms illustrating gain changes per amplifier for respective different channel fill amounts in the optical network section of FIG. 1A;

FIG. 6 illustrates, in one example embodiment, a method of managing an optical communications network comprising a plurality of nodes interconnected by optical sections.

FIG. 7 illustrates, in another example embodiment, a method of managing an optical communications network comprising a plurality of nodes interconnected by optical sections.

It will be noted that throughout the appended drawings, like features are identified by like reference numerals.

DETAILED DESCRIPTION

Figure 2A:
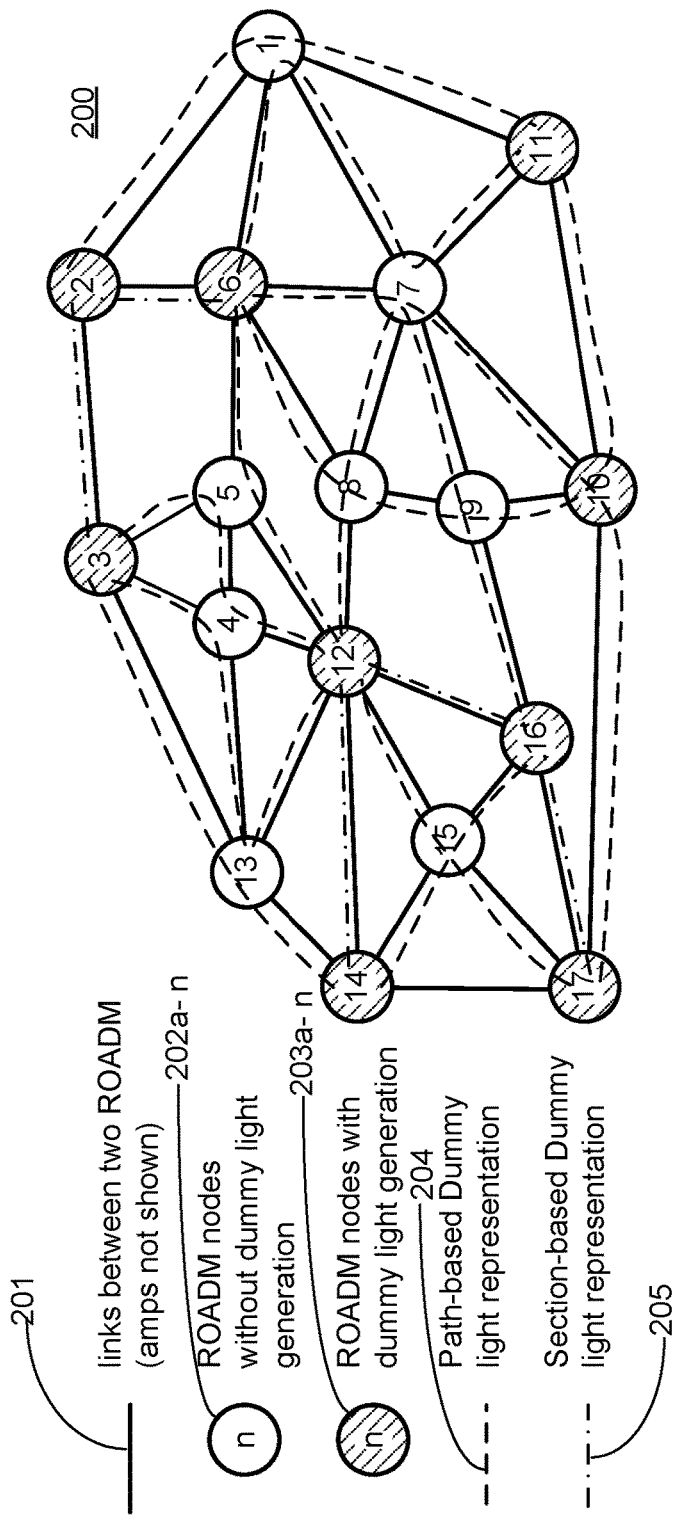
FIGS. 2A and 2B illustrate Dummy Light (DL) paths in a representative network.

In this invention, a path-based dummy light (DL) technique is described for fast channel turn up/down that allows migration of today's quasi-static optical networks toward an "all-cloud" paradigm. The present technique applies to a sub-equipped dummy light network and offer both cost saving and migration opportunity in comparison with green field deployment of a fully-equipped section-based dummy light scheme.

Conventional software solutions are not sufficiently reliable, and it will not possible to apply them to the network for some years to come. On the other hand, existing hardware based solutions require all of the nodes of a network to be equipped with dummy light hardware in order to have a fast switch over for dynamic services in the next generation optical networks. The present invention provides a path-based sub-equipped dummy light technique for optical network that requires only some nodes of the networks to be equipped with dummy light hardware while maintaining the same benefits as a fully-equipped scenario. In comparison with fully-equipped section-based dummy light solution, the proposed sub-equipped dummy light (DL) not only offer cost saving but also allows migration of today's networks with fast service turn-up time.

Among other advantages and benefits, embodiments of invention discussed herein provide a solution that addresses such shortcomings by using dummy light paths, and proposes a solution in which a half-fill, or other such sub-equipped, network can offer almost the same benefits as a full-equipped one. In alternate embodiments, other threshold fill conditions other than a half-fill condition may be applied to each section of the path. For example, in some embodiments, threshold fill conditions of 30% to 45% may be applied, though it is contemplated that other threshold fill conditions may be used.

In this description, the term "fully-equipped" means that every node is equipped with dummy light hardware capable of supplying dummy light to every outgoing channel. By comparison, the term "sub-equipped" means that either fewer than all nodes in a network are equipped with dummy light hardware.

Before discussing path-based dummy light techniques, we discuss the rationale behind it. Let's examine the measured EDFA gain changes for both full-fill and partial fill for a 50 GHz grid DWDM section (comprising 80 channels) connecting two ROADM nodes 101a, b with five amplifiers 102a-e operating in gain mode, as shown in FIG. 1A. Let us assume a management action is to add or delete a single channel, meaning that an action on a super channel is performed in sequence. For a full-fill 105 (or, equivalently, 100-percent fill) section with all 80 channels carrying light, there is literally no change in gain when actions performed on any one of the channels, as shown with a set of overlapping solid lines in FIG. 1B. Two other gain profile examples of half-fill 106 and quarter-fill 107 (i.e. 40 channels and 20 channels carrying light, respectively) with uniform loading, is also shown in FIG. 1B. Assuming full-fill scenario as a reference, FIGS. 1C and 1D shows histograms 110, 111 of an amplifier gain changes for all possible single channel actions (i.e., either adding or removing a channel) on the spectrum for quarter-fill 107 and half-fill 106, respectively. As may be seen in FIG. 1D, the maximum EDFA gain change for half fill 106 (50-percent fill) is at most 0.06 dB when the state of the section changes by adding or removing a single section (i.e. from 40 channels to 39 or 41 channels). This means that for a long haul connectivity between a source and destination pair traversing through, for example, 16 amplifiers, the worst possible gain change is less than 1 dB. This gain change can be accommodated as part of the link budget margin. It is noted that maintaining a quasi-uniform loading on the section, as opposed to perfect uniform loading, can yield a similar result. Quasi-uniform loading can be achieved by proper mapping of the spectrum assigned by the path computation element (PCE) to the physical one. An example of logical to physical mapping could be described as follows. Given that channels assigned are logically enumerated from 1 to 80 on each link, a logical channel 1 can be mapped to physical channel #1, logical channel #2 to physical 40, and logical 3 to physical channel #20, logical channel #4 to physical 60, 5 to 10, 6 to 50, 7 to 30, 8 to 70, and so on. As seen with this mapping there is some measure of uniformity may be achieved on the physical links as the channel is assigned by PCE. The minimal gain changes for half-fill 106 provides motivation to use path-based dummy light in a network, provided that for any traffic condition and any network loading, each section has at least half-fill 106 of dummy light and signal light.

Based on the results of gain changes, if we assume only some (say half) of the nodes of a network are equipped to generate Dummy Light (DL), then the question to answer is how to set-up static DL paths so as to maximize the proportion of sections in the network that have at least 40 channels (or, more generally, half of the wavelength channels) carrying dummy lights and optical signals under any network loading circumstances.

Figure 2B:
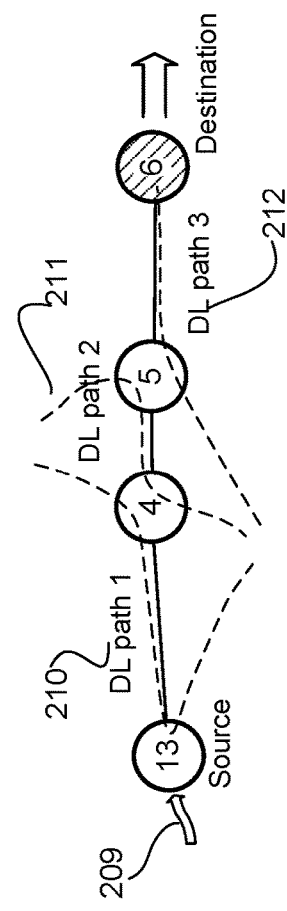

FIG. 2A shows an evolved version of an example optical network 200. The network has 17 ROADM nodes 202a-n, 72 unidirectional WDM sections (36 bi-directional sections) each of which forms a section on the 50G ITU grid. We assume some random number of the nodes 203a-n of this network, as shown, are equipped to generate dummy lights and discuss how dummy light paths can be constructed so that a sub-equipped network of dummy light can offer similar fast switch over and stability benefits as the fully equipped network. For any sub-equipped network, there is a set of sub-optimal dummy light paths that can potentially satisfy the condition of half-fill 106 (e.g. 40 combined dummy light and traffic signals in an 80 channel DWDM system) or more on each section. The creation of optimum dummy light paths 204 that meet the requirement requires two things. One is the intelligence derived from the utilization of each section for all possible routes obtained from a cost-based routing technique, such a shortest path routing, or a cost-based optical reach graph. The other is engineering rules to ensure all sections are covered by at least one DL source. In addition, for simplicity, we can constrain the model by assuming that the DL path 204 between two DL-equipped nodes 203 is the same for both directions. We can also assume that DL in any given section is supplied by only one DL source. In general, however, having more than one DL source per section, with intelligent WSS filtering at each node, improves the performance at the expense of complexity. It is noted that DL paths 204 and connection paths 201 are independent from each other. For example, as illustrated in FIG. 2B, a connection path 209, added at node 13 and dropped at node 6, encounters three different DL-paths 210, 211, 212. As this connection is being set-up on a given wavelength, each of the WSSs that are involved in the connection path filters out the same DL channel on all 3 DL paths 210, 211, 212. This analysis is based on the link utilization for a given routing protocol connecting any source-destination node pairing. For a network with N nodes there are N(N−1) possible pairing exist. Since each node does not have N−1 direct links to connect to the other N−1 nodes, i.e., network is not a full mesh, the source-node destination pairing is not a single hop. Rather, it is multi-hop to connect a source node to a destination. As a result, depending on the network topology and routing protocol (e.g., shortest path) some links are used heavily and some other are lightly used for connectivity of N(N−1) source-destination pairing.

In some embodiments, the dummy light source may be a CW source or an ASE source comprised of a single source that is split and propagated to all links of a node. Such single source CW or ASE may be deployed for all directions of a ROADM node in conjunction with filtering for each inbound or out-bound links of a node.

Figure 2C:
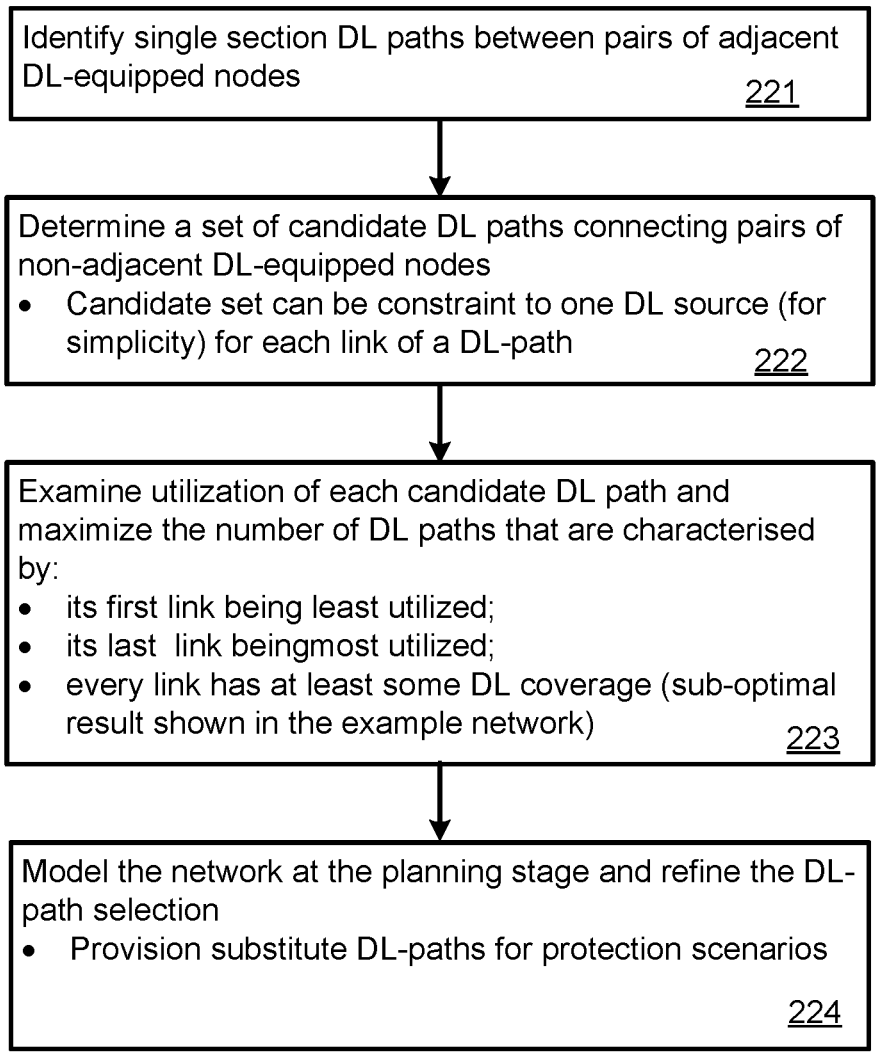
FIG. 2C is a flow-chart illustrating a representative process for determining DL paths in a network.

FIG. 2C shows steps in a representative process 220 for determining DL paths 204 in a sub-equipped network. At step 221, pairs of adjacent DL-equipped nodes 203 implement section-based DL (which may also be referred to as a single section DL path) while, at step 222, pairs of non-adjacent DL-equipped nodes 203 require identification of sub-optimal DL-paths at the network planning stage, for example. This may be done by using section utilization for all node-to-node connectivity matrixes used in the network routing protocol or a cost-based optical reach graph. At step 223, as there are many DL-path candidates between non-adjacent DL-equipped nodes, the selection of a particular candidate DL-path (for any given pair of non-adjacent DL-equipped nodes 203) is preferably based on maximizing the number of DL-paths that are characterised by their first section being least utilized by the connectivity matrix; the last section of a DL-path being most utilized; and the selected set of DL-paths should cover all the sections connecting pairs of non-adjacent DL-equipped nodes 203.

Figure 2D:
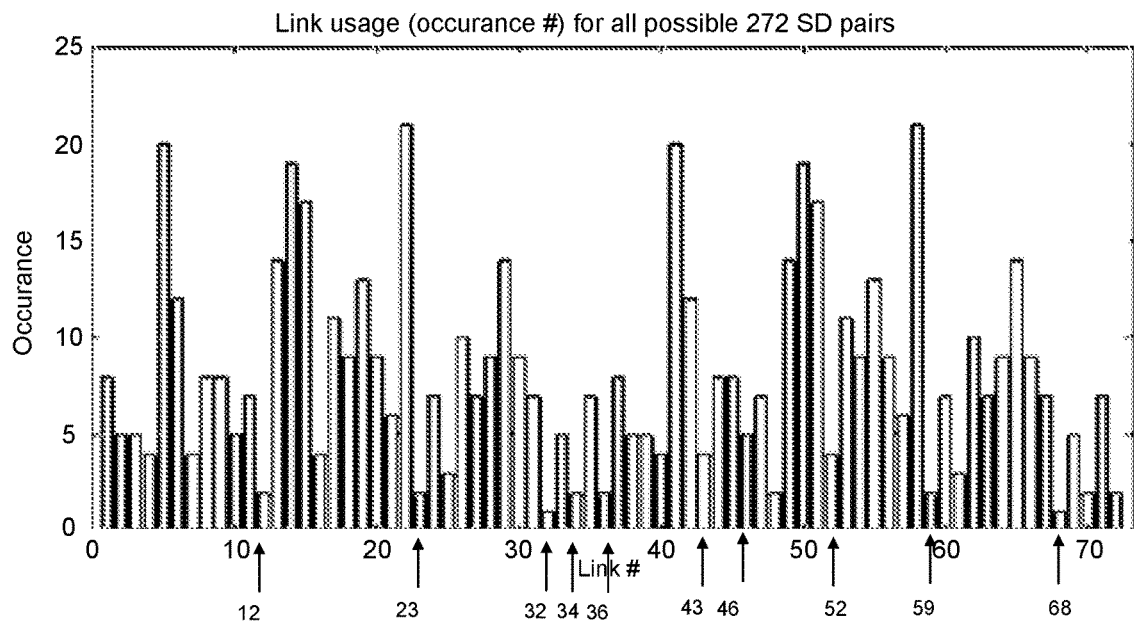
FIG. 2D is a histogram link utilization chart of a representative network for determining DL paths in the network.
Figure 2E:
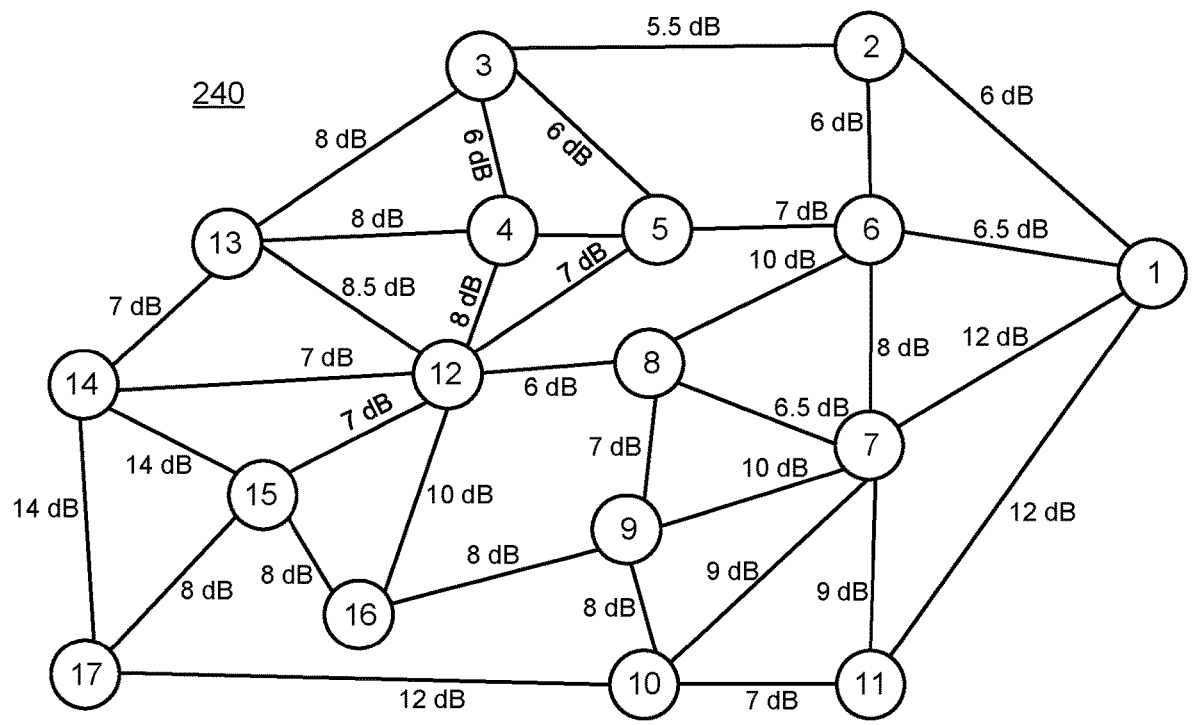
FIG. 2E illustrates a network example of a link loss metric, in particular based on span loss.

FIG. 2D is a histogram link utilization chart 230 of a representative network for determining DL paths in the network, in an illustrative example of utilization of links for a network of N nodes. In this example, there are N(N−1) possible source destination pairs for such a network. When a routing scheme is used to connect the pairs, e.g., shortest path, some links are more utilized than others. An example is a network of FIG. 2A with 17 nodes. There are 272 possible source-destination pairs. If, in an example case, a shortest path routing protocol is used to connect these pairs and gather the number of times each link is utilized, the utilization graph is as illustrated in FIG. 2D. In the utilization histogram chart of FIG. 2D graph, the X-axis is the link number (1 to 72 for the example network) and the Y-axis is the relative number of times each link is utilized. Some of all occurrences are 272, as a result the Y-axis could be normalized to a utilization percentage. In FIG. 2D, the links marked with arrows are not heavily utilized for signals, and as a result they need to have more dummy lights. In this particular example, the histogram 230 of FIG. 2D on link utilization (that scales with loading) can be applied and used to find the optimal or sub-optimal multi-section DLs among the candidates. The histogram 230 of FIG. 2D on link utilization may be obtained by using the shortest path routing in this particular example with a cost metric of "link loss", for example based on span loss as depicted in network 240 of FIG. 2E. In other embodiments, the link loss cost metric may be based on optical signal-to-noise ratio (OSNR).

Example sub-optimal DL-paths derived at step 224 using the method 220 described above with reference to FIG. 2C are shown in FIG. 2A. The selected paths are based on the section utilization of all 272 possible connections for all 17 nodes of the network with shortest path as the routing protocol and section loss as the cost metric.

Figure 3A:
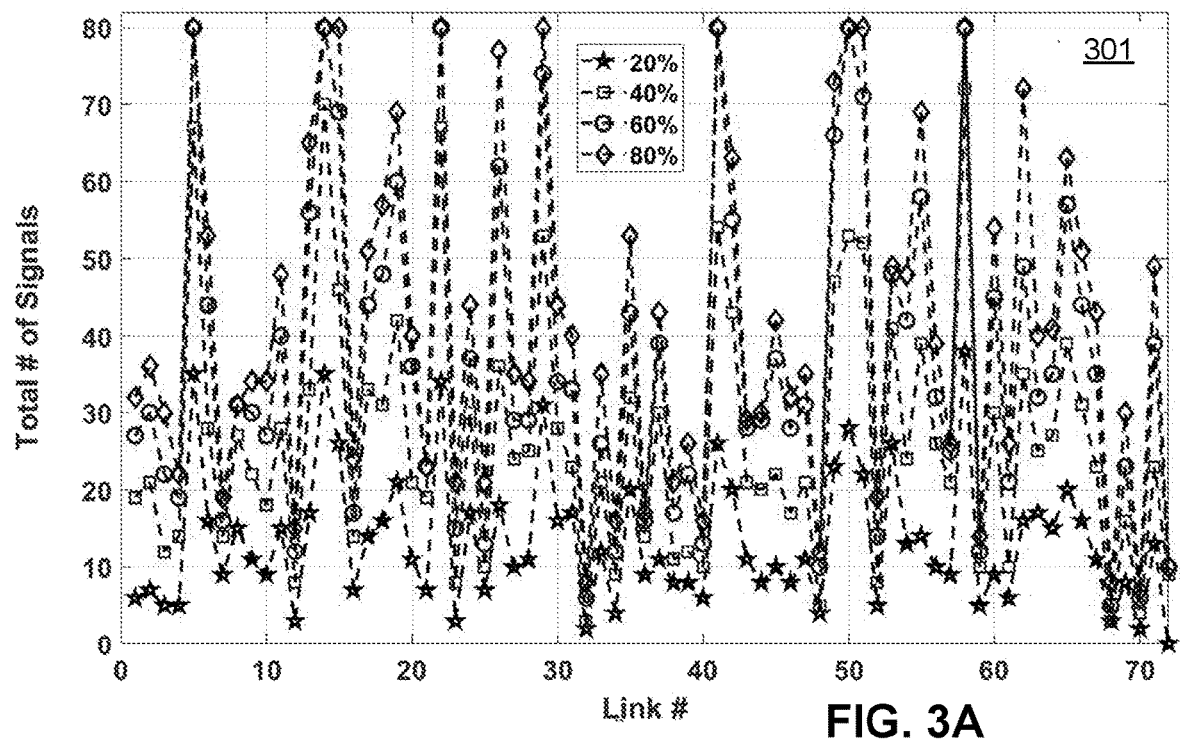
FIGS. 3A and 3B are charts illustrating a fill of each sections in the network of FIG. 2A
Figure 3B:
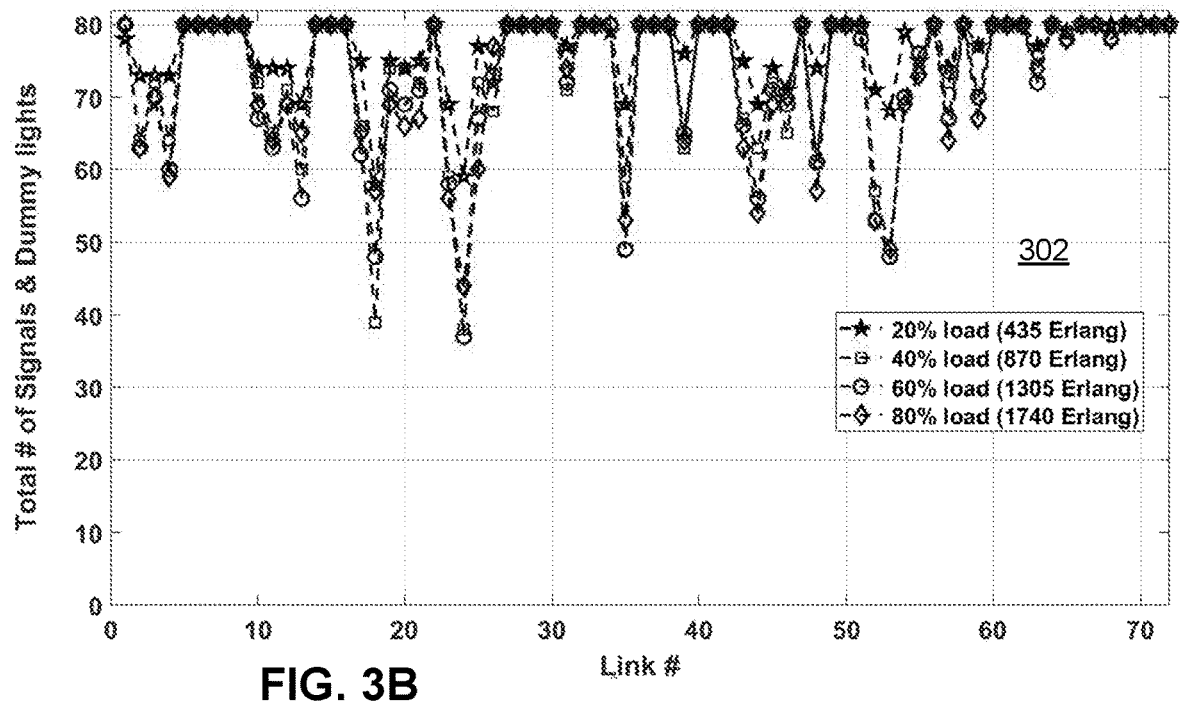

Simulation of the sub-equipped DL network of FIG. 2A for various network loading scenarios and up to 2175 Erlang (that represent 100% loading) was performed to determine the section state of each section of the network. FIG. 3 shows the state of all 72 sections for 20%, 40%, 60% and 80% loading scenarios. FIG. 3A shows the number of channels carrying optical signal traffic 301 on each section whereas FIG. 3B shows the total number of occupied channels 302 (i.e. the sum of the channels occupied by optical signal traffic and channels occupied by dummy light) on each section. As may be seen for the example network with the identified DL-paths, 70 of the 72 sections have more than 40 occupied channels (combined signals and dummy lights) for all traffic loading scenarios. The other two sections are close to the threshold (40 occupied channels) as these sections have respective totals of 36 and 38 occupied channels sum of signals and dummy lights) for loads between 40% and 60%.

Although in the example scenario of FIGS. 2 and 3, only 8 of the 17 nodes are DL-equipped, a network operator can evaluate a wide range of equipping scenarios for deployments. Another use case of the proposed DL-path approach is DL protection of a section-based network. For example, when DL hardware of a section or a node fails, a set of DL-paths can be formed by stitching the DL of the other nodes to the sections of node whose DL failed.

Figure 4A:
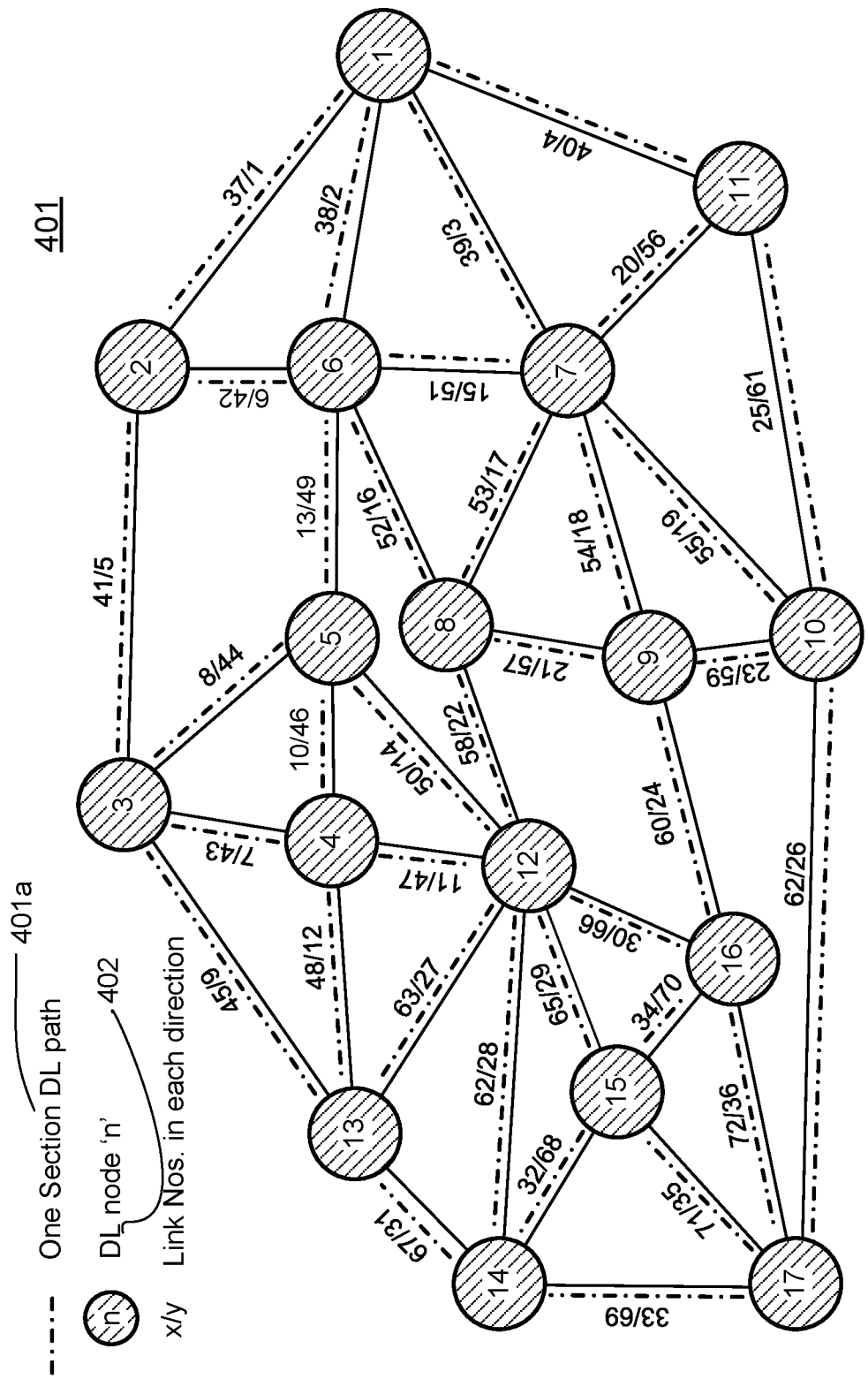
FIG. 4A illustrates an example network with single section DL paths.
Figure 4B:
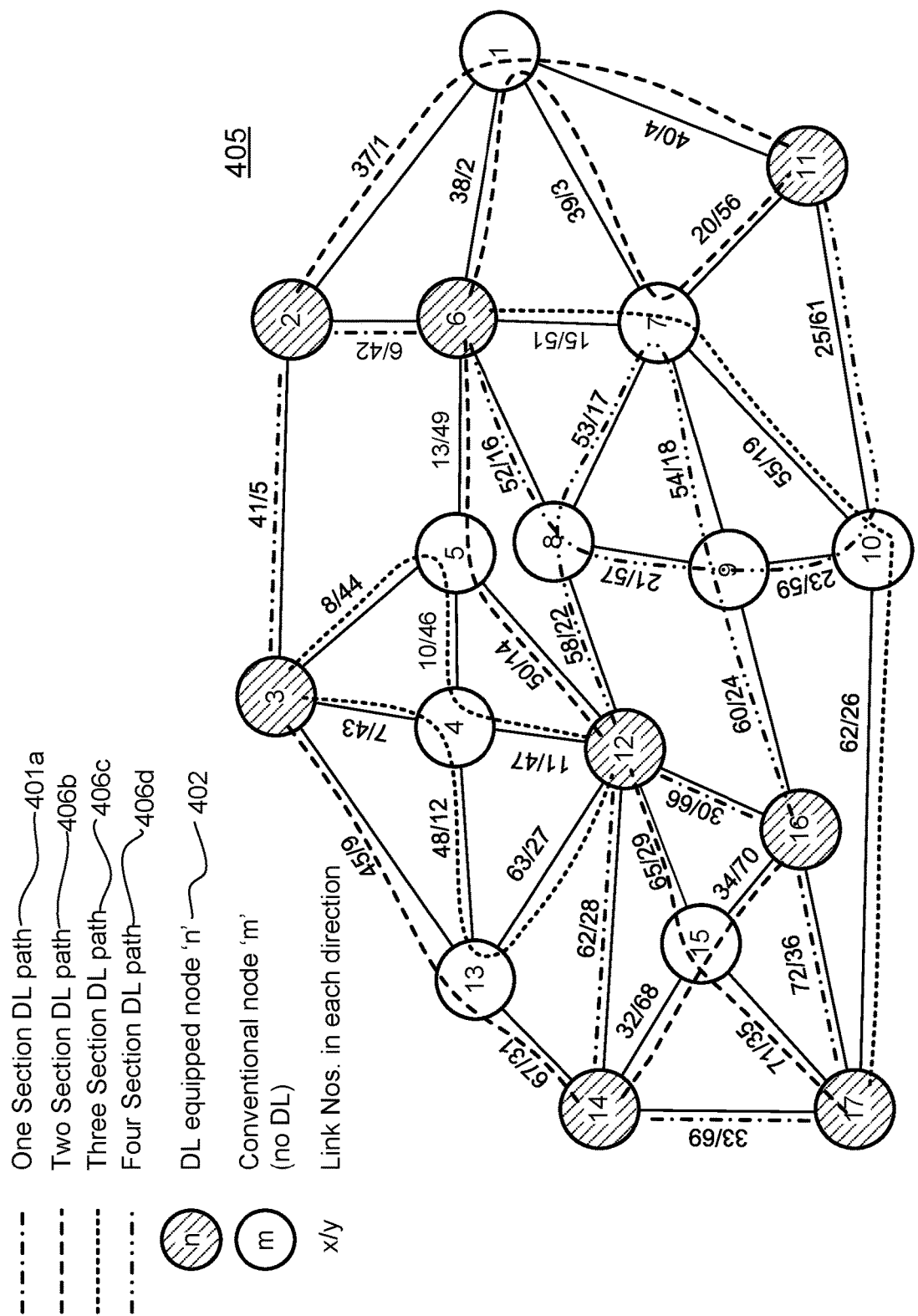
FIG. 4B illustrates an example network with a combination of single and multi-section DL paths.

FIGS. 4A and 4B illustrate use cases 401, 405 in which techniques in accordance with the present invention are used to reduce costs relative to a fully-equipped network. In the case of a fully equipped network, all nodes of the network are equipped with dummy light hardware. The sub-equipped network allows a cost saving.

For example, FIG. 4A illustrates a fully equipped network 401, in which every node is equipped with dummy light hardware. In this case, every DL-equipped node is adjacent to another DL-equipped node, so that the entire network is deployed with single section DL paths.

FIG. 4B illustrates network 405 having a corresponding topology as FIG. 4A, but is sub-equipped, so that only some nodes 402 (eight in the example of FIG. 4B) are equipped with dummy light hardware. In the illustrated example, seven of the DL-equipped nodes 402 are adjacent to one another, so the adjoining sections may be covered by single section DL paths 401a. The remaining sections are covered by multi-section paths 406b-d that are selected in accordance with the methods 220 described above with reference to FIGS. 2A-2C.

An advantage of present invention is that it offers reduced cost as the sub-equipped network of FIG. 4B has less than 50% of its nodes equipped with DL hardware.

In today's network, some nodes may not have sufficient shelf slots to accept dummy light hardware. As a result, a network operator can examine which nodes can accept the hardware and which nodes cannot. This lead to a sub-equipped network. In this case, the operator can use the techniques described herein to select suitable dummy light paths for the network. This approach represents a brown field deployment of the invention. A fully-equipped network solution may be satisfactory in a green field deployment but is rarely compatible with existing networks. The present invention offers a solution that is readily adaptable to existing networks.

Multi-section DL paths can also be used to provide equipment protection of dummy light hardware. Since dummy light hardware may be used to supply dummy light for all outgoing sections of a ROADM, the reliability of the dummy light hardware is important. One way to ensure reliability is to implement a 1+1 hardware protection scheme in each node. However, 1+1 protection doubles both the cost and the shelf space occupied by the DL hardware, by requiring that two sets of the DL hardware are deployed at each node.

Figure 5A:
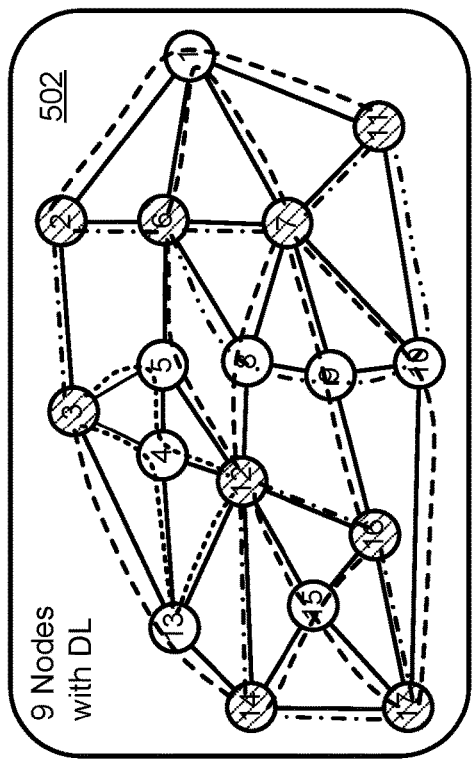
FIGS. 5A-5D show, in one example, a series of configurations in which multi-section DL paths are extended to recover from the failure of DL hardware at one or more nodes.
Figure 5B:
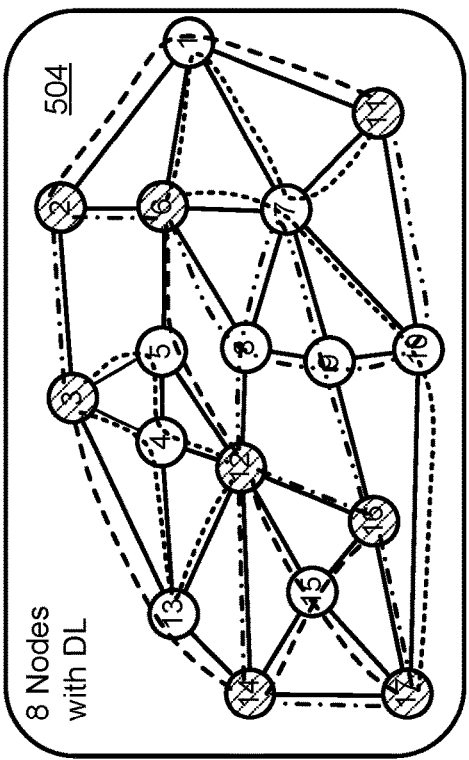

The present invention provides an alternative solution, in which no DL hardware protection is provided, but multi-section DL paths are used in the event of a hardware failure. FIGS. 5A-5D show an example in which multi-section DL paths are extended to recover from the failure of DL hardware at one or more nodes. FIG. 5A shows an example sub-equipped network 501, in which ten nodes (i.e. nodes 2, 3, 6, 7, 11, 12, 13, 14, 16 and 17) are equipped with DL hardware, and a combination of single-section and multi-section DL paths are configured in the network. The remaining nodes (i.e. nodes 1, 4, 5, 8, 9, 10, and 15) are not equipped with DL hardware. These non-DL equipped nodes operate as intermediate nodes of multi-section DL paths, and are controlled to pass inbound dummy lights in an upstream optical section to at least one other optical section. For example, a Wavelength Selective Switch (WSS) of a non-DL equipped node can be controlled to pass through DL lights (on a per-channel basis) in a manner similar to that used to pass through optical signal channels. If the DL equipment at one of the nodes fails, then DL paths can be extended to recover from the failure. For example, prior to the DL hardware failure, the WSS of the DL-equipped node is configured to terminate one or more inbound DL channels. Following the DL hardware failure, the node can be controlled to function as a non-DL equipped node, by controlling its WSS to pass through the previously terminated DL channels to a downstream section. FIG. 5B shows an example state of the network 502 following recovery after a failure of the DL equipment at node 13. In the example of FIG. 5B, the DL equipment failure at node 13 is recovered by: extending the two-section path 3-4-13 (i.e. between nodes 3 and 13 via node 4) to terminate at node 12; and by replacing the two single-section paths 13-14 and 3-13 using a two-section path 3-13-14.

Figure 5D:
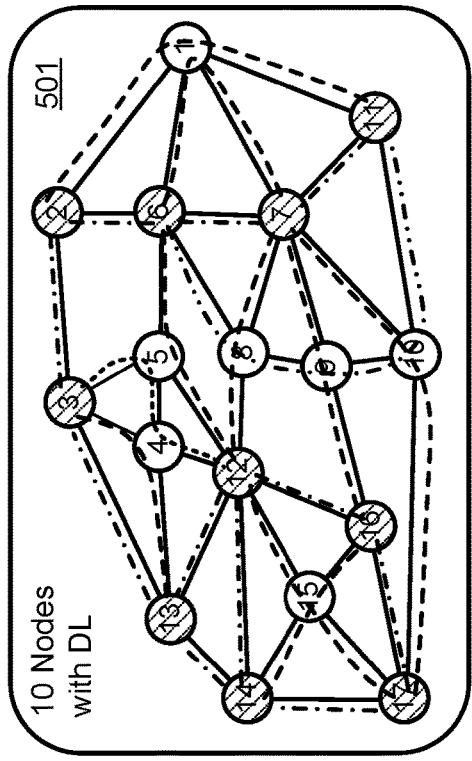
Figure 5C:
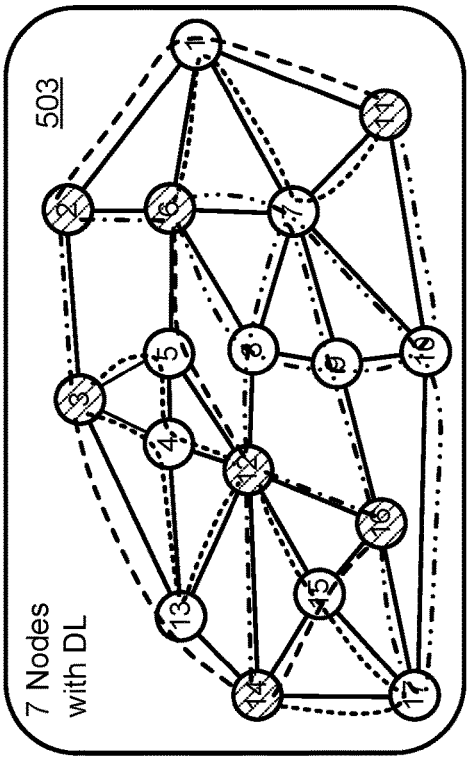

FIG. 5C shows an example state of the network 503 following recovery after a failure of the DL equipment at node 7. In the example of FIG. 5C, the DL equipment failure at node 7 is recovered by: extending the two-section path 17-10-7 to terminate at node 6; extending the two-section path 6-1-7 to terminate at node 11; and by replacing the two two-section paths 16-9-7 and 12-8-7 using a four-section path 12-8-7-9-16.

FIG. 5D shows an example state of the network 504 following recovery after a failure of the DL equipment at node 17. In the example of FIG. 5D, the DL equipment failure at node 17 is recovered by: extending the two-section path 12-15-17 to terminate at node 14; and extending the three-section path 6-7-10-17 to terminate at node 16.

FIG. 6 illustrates, in one example embodiment, method 600 of managing an optical communications network comprising a plurality of nodes interconnected by optical sections.

At step 610, identifying pairs of adjacent DL-equipped nodes at which dummy light hardware is deployed at fewer than the plurality of the nodes of an optical communications network, the DL hardware deployed at a particular node configured to supply dummy light to each optical section extending from the particular node and defining a respective single-section DL path between each identified pair of adjacent DL-equipped nodes.

At step 620, identifying pairs of non-adjacent DL-equipped nodes at which DL hardware is deployed, and defining a respective multi-section DL path between each identified pair of non-adjacent DL-equipped nodes.

At step 630, causing the deployed DL hardware to supply DL light to each of the single-section and the multi-section DL paths.

FIG. 7 illustrates, in another example embodiment, method 700 of managing an optical communications network comprising a plurality of nodes interconnected by optical sections.

At step 710, allocating dummy light (DL) hardware to a subset of a plurality of nodes of an optical network, the subset comprising less than the plurality of nodes.

At step 720, for each pair of non-adjacent nodes to which DL hardware is allocated, identifying candidate multi-section DL paths between the pair of non-adjacent nodes and analyzing each candidate multi-section DL path to identify an optimal candidate multi-section DL path that satisfies a threshold fill condition on each section of the path.

At step 730, implementing the identified optimal candidate multi-section DL path by controlling each one of the pair of non-adjacent nodes to transmit or terminate dummy light through the identified best one of the candidate multi-section DL paths, and controlling intermediate nodes traversed by the identified optimal candidate multi-section DL paths to pass through dummy light associated with the identified optimal candidate multi-section DL paths.

Figure 8:
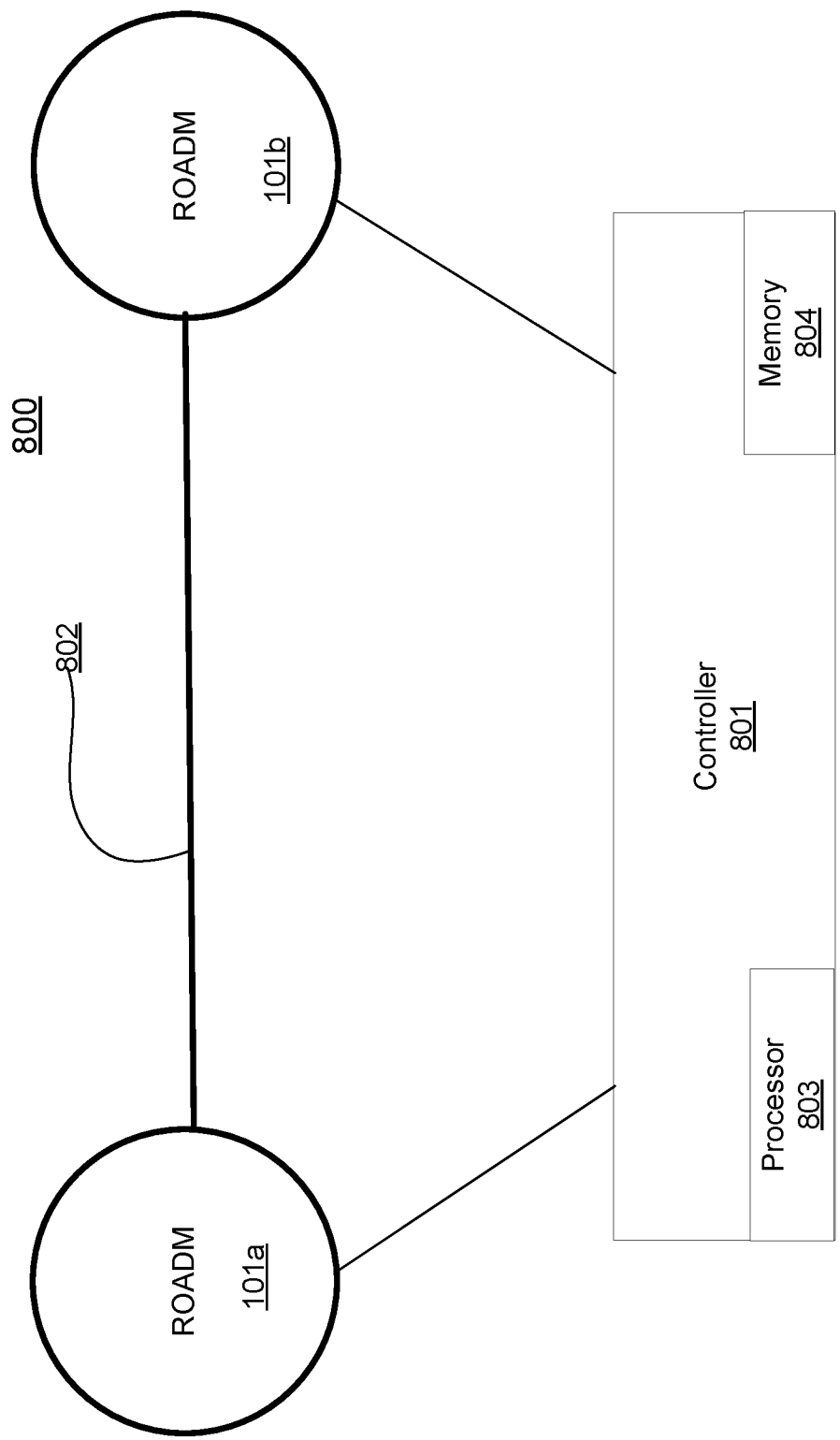
FIG. 8 illustrates, in an example embodiment, an architecture including a controller in an optical communications network.

FIG. 8 illustrates, in an example embodiment, an architecture including a controller in an optical communications network 200. FIG. 8 illustrates, in a component diagram, an example of optical network section 800 of the optical communications network 200. The optical network section 800 may comprise a first ROADM 101a optically coupled to a second ROADM 101b via an optical link 802. Any number of amplifiers (not shown) may be implemented between ROADMs 101a, 101b. A controller 801 may be connected to the ROADMs 101a, 101b. The controller 801 may operate the ROADMs 101a, b to send optical signals via the optical link 802. The controller 801 may include a processor 803 and a non-transient memory 804 storing instructions that are executable in processor 803. In one embodiment, the controller 801 may comprise a software defined network (SDN) controller that implements a network monitoring and management software layer. The functionality of the controller 801 may also partially or fully reside on nodes associated with the optical section, for example ROADMs 101a, b.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of managing an optical communications network comprising a plurality of nodes interconnected by optical sections, the method comprising:
    identifying one or more pairs of adjacent dummy light (DL) equipped nodes at which dummy light (DL) hardware is deployed, respective dummy light (DL) hardware being deployed at fewer than the plurality of the nodes of the optical communications network, the respective DL hardware deployed at a particular node configured to supply dummy light to each optical section extending from the particular node, and defining a respective single-section DL path between each identified pair of adjacent DL-equipped nodes;
    identifying one or more pairs of non-adjacent DL-equipped nodes at which DL hardware is deployed, and defining a respective multi-section DL path between each identified pair of non-adjacent DL-equipped nodes; and
    causing the deployed DL hardware to supply dummy light to each of the single-section and the multi-section DL paths;
    wherein defining a respective single-section DL path between each identified pair of adjacent DL-equipped nodes comprises, for each pair of non-adjacent nodes to which DL hardware is allocated:
    identifying candidate multi-section DL paths between the pair of non-adjacent nodes; and
    analyzing each candidate multi-section DL path to identify an optimal candidate multi-section DL path that satisfies a threshold fill condition on each section of the path; and
    wherein two or more candidate multi-section DL paths satisfy the threshold fill condition on each section of the path, and wherein analyzing each candidate multi-section DL path to identify the optimal candidate multi-section DL path comprises, for each candidate multi-section DL paths that satisfies the threshold fill condition on each section of the path:
    analyzing an optical signal loading of each section of the candidate multi-section DL path; and
    identifying the optimal candidate multi-section DL path that satisfies a condition of a lowest optical signal loading in a first section of the candidate multi-section DL path and a highest optical signal loading in a last section of the candidate multi-section DL path.

2. A method of managing an optical communications network comprising a plurality of nodes interconnected by optical sections, the method comprising:
    allocating dummy light (DL) hardware to a subset of the plurality of nodes, the subset comprising less than the plurality of nodes; and
    for each pair of non-adjacent nodes to which DL hardware is allocated:
    identifying candidate multi-section DL paths between the pair of non-adjacent nodes;
    analyzing each candidate multi-section DL path to identify an optimal candidate multi-section DL path that satisfies a threshold fill condition on each section of the path by:
    analyzing an optical signal loading of each section of the candidate multi-section DL path; and
    identifying the optimal candidate multi-section DL path that satisfies a condition of a relatively lower optical signal loading in a first section of the candidate multi-section DL path and a relatively higher optical signal loading in a last section of the candidate multi-section DL path; and
    implementing the identified optimal candidate multi-section DL path by:
    controlling each one of the pair of non-adjacent nodes to transmit or terminate dummy light through the identified optimal candidate multi-section DL path; and
    controlling intermediate nodes traversed by the identified optimal candidate multi-section DL path to pass through dummy light associated with the identified optimal candidate multi-section DL path.

3. The method of claim 2, wherein two or more candidate multi-section DL paths satisfy the threshold fill condition on each section of the path.

4. The method of claim 2, further comprising:
    detecting a failure of DL hardware at a DL-equipped node, the failed DL hardware previously supplying dummy light to an outbound DL path;
    responsive to detecting the DL hardware failure:
    identifying an inbound DL path having an end-point at the DL-equipped node; and
    controlling the DL-equipped node to pass through dummy light from the identified inbound DL path to the outbound DL path.

5. The method of claim 4, wherein the outbound DL path is one of a single-section DL path and a multi-section DL path.

6. The method of claim 5, wherein the inbound DL path is one of a single-section DL path and a multi-section DL path.

7. The method of claim 2, wherein the dummy light hardware comprises one of a continuous wave (CW) laser source and an amplified spontaneous emission (ASE) source.

8. An optical network comprising:
    a plurality of nodes interconnected by optical sections; and
    a controller, the controller comprising:
    a processor; and
    a non-transient memory storing instructions executable in the processor to:
    allocate dummy light (DL) hardware to a subset of the plurality of nodes,
    the subset comprising less than all of the plurality of nodes; and
    for each pair of non-adjacent nodes to which DL hardware is allocated:
    identify candidate multi-section DL paths between the pair of non-adjacent nodes;
    analyze each candidate multi-section DL path to identify an optimal candidate multi-section DL path that satisfies a threshold fill condition on each section of the path by:
    analyzing an optical signal loading of each section of the candidate multi-section DL path; and
    identifying the optimal candidate multi-section DL path that satisfies a condition of a relatively lower optical signal loading in a first section of the candidate multi-section DL path and a relatively higher optical signal loading in a last section of the candidate multi-section DL path; and
    implement the identified optimal candidate multi-section DL path by:

controlling each one of the pair of non-adjacent nodes to transmit or terminate dummy light through the identified optimal candidate multi-section DL path; and controlling intermediate nodes traversed by the identified optimal candidate multi-section DL path to pass through dummy light associated with the identified optimal candidate multi-section DL path.

9. The optical network of claim 8, wherein two or more candidate multi-section DL paths satisfy the threshold fill condition on each section of the path.

10. The optical network of claim 8, further comprising instructions executable in the processor to:

detect a failure of DL hardware at a DL-equipped node, the failed DL hardware previously supplying dummy light to an outbound DL path;

responsive to detecting the DL hardware failure:

identify an inbound DL path having an end-point at the DL-equipped node; and control the DL-equipped node to pass through dummy light from the identified inbound DL path to the outbound DL path.

11. The optical network of claim 10, wherein the outbound DL path is one of a single-section DL path and a multi-section DL path.

12. The optical network of claim 10, wherein the inbound DL path is one of a single-section DL path and a multi-section DL path.

13. The optical network of claim 8, wherein the dummy light hardware comprises a single source that includes one of a continuous wave (CW) laser source and an amplified spontaneous emission (ASE) source.

14. The optical network of claim 13 wherein the single source is split and propagated to a set of links in all directions of a reconfigurable optical add-drop multiplexer (ROADM) node in conjunction with filtering for each inbound or out-bound links of the ROADM node.

\* \* \* \* \*